(12) United States Patent  
Taghavi Nasrabadi et al.

(10) Patent No.: US 8,867,667 B2  
(45) Date of Patent: Oct. 21, 2014

(54) SYSTEMS AND METHODS FOR MONITORING A WIRELESS NETWORK

(75) Inventors: Mohammad Hossein Taghavi Nasrabadi, San Diego, CA (US); Hemanth Sampath, San Diego, CA (US); Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/438,639

(22) Filed: Apr. 3, 2012

(65) Prior Publication Data

US 2012/0250731 A1    Oct. 4, 2012

Related U.S. Application Data

(60) Provisional application No. 61/471,412, filed on Apr. 4, 2011.

(51) Int. Cl.  
*H04L 27/00* (2006.01)  
*H04W 88/06* (2009.01)

(52) U.S. Cl.  
CPC .................................... *H04W 88/06* (2013.01)  
USPC ........... 375/316; 375/147; 375/219; 375/220; 375/260; 375/267; 375/326; 375/340; 375/342; 375/347; 455/63.1; 455/67.13; 455/69; 455/101; 455/114.2; 455/132; 455/500; 455/562.1; 370/335; 370/342; 370/480; 341/173; 341/180

(58) Field of Classification Search  
CPC ..................................................... H04W 88/06

USPC ......... 375/147, 219, 220, 260, 267, 316, 326, 375/340, 342, 347; 455/63.1, 67.13, 69, 455/101, 114.2, 132, 500, 562.1; 370/335, 370/342, 480; 341/173, 180  
See application file for complete search history.

(56) References Cited

U.S. PATENT DOCUMENTS

| 7,629,886 B2 | 12/2009 | Steeves |
| 7,702,371 B2 | 4/2010 | Edwards et al. |

(Continued)

FOREIGN PATENT DOCUMENTS

| EP | 1942613 A2 | 7/2008 |
| WO | WO2006127154 A1 | 11/2006 |

OTHER PUBLICATIONS

Pering; Trevor et al. CoolSpots: Reducing the Power Consumption of Wireless Mobile Devices with Multiple Radio Interfaces pp. 220-232.

(Continued)

*Primary Examiner* — Leon Flores  
(74) *Attorney, Agent, or Firm* — Jim O'Hare; Michael Harris

(57) ABSTRACT

Systems, methods, and devices to enable monitoring of wireless networks are described herein. In some aspects, a low power receiver or a receiver operating in a low power mode scans for signals with a moderate or low duty cycle. If a signal identifying a device or user of the receiver, or a signal indicating that there will be a subsequent data communication, is received, a high power receiver or a receiver operating in a high power mode is activated to receive data communications.

67 Claims, 8 Drawing Sheets

(56) References Cited

U.S. PATENT DOCUMENTS

| | | | |
|---|---|---|---|
| 2004/0266493 A1* | 12/2004 | Bahl et al. | 455/574 |
| 2005/0190714 A1 | 9/2005 | Gorbatov et al. | |
| 2010/0099358 A1 | 4/2010 | Kumar et al. | |
| 2011/0065413 A1* | 3/2011 | Singer | 455/343.2 |
| 2011/0116429 A1 | 5/2011 | Jeon et al. | |
| 2011/0130092 A1* | 6/2011 | Yun et al. | 455/39 |

OTHER PUBLICATIONS

International Search Report and Written Opinion—PCT/US2012/032223—ISA/EPO—Jun. 4, 2012.

Pletcher N., et al., "Ultra-Low Power Wake-Up Receivers for Wireless Sensor Networks", Ph.D. Dissertation, UC Berkeley, 2008, 164 pages.

\* cited by examiner

SYSTEMS AND METHODS FOR MONITORING A WIRELESS NETWORK

CROSS-REFERENCE TO RELATED APPLICATIONS

This application claims priority under 35 U.S.C. §119(e) to U.S. Provisional App. No. 61/471,412, filed Apr. 4, 2011, which is incorporated by reference herein in its entirety.

BACKGROUND

1. Field

The present application relates generally to wireless communications, and more specifically to systems, methods, and devices for monitoring a wireless network. Certain aspects herein relate to enabling a high power receiver based on information received at a low power receiver.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise data packets, for example that include overhead information (e.g., header information, packet properties, etc.) that helps in routing the packet through the network, identifying the data in the packet, processing the packet, etc., as well as data, for example user data, multimedia content, etc. as might be carried in a payload of the packet.

Communications between devices in the wireless network may be intermittent. To ensure that such communications are received, a device may monitor the wireless network for communications that are relevant to or addressed to the device. In some networks, a paging message may be transmitted to the device to alert the device that a data communication will follow. Monitoring the wireless network for paging messages or other communications, however, may be costly to the device because of power consumed by the monitoring. Thus, improved systems, methods, and devices for monitoring a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the overhead in transmitting payloads in data packets.

One aspect of the disclosure provides an apparatus for wireless communication. The apparatus comprises a first receiver configured to wirelessly receive data. In some aspects, the first receiver consumes a first power when activated. The apparatus may further comprise a second receiver configured to receive wireless control information. The second receiver may consume a second power when activated, and the second power may be less than the first power. The apparatus may further comprise a processor configured to noncontinously activate the second receiver, and to selectively activate the first receiver based at least in part on the received control information.

Another aspect of the disclosure provides a method for wireless communication. The method comprises periodically activating a first receiver, wirelessly receiving control information during one or more periods in which the first receiver is activated, selectively activating a second receiver based at least in part on the received control information, and wirelessly receiving data during one or more periods in which the second receiver is activated. In some aspects, the first receiver consumes a first power when activated, and the second receiver consumes a second power when activated. The first power may be less than the second power.

Another aspect of the disclosure provides an apparatus for wireless communication. The apparatus comprises means for wirelessly receiving data. In some aspects, the means for wirelessly receiving data consumes a first power when activated. The apparatus may further comprise means for wirelessly receiving control information. The means for wirelessly receiving control information may consume a second power when activated, and the second power may be less than the first power. The apparatus may further comprise means for periodically activating the means for wirelessly receiving control information, and means for selectively activating the means for wirelessly receiving data based at least in part on the received control information.

Another aspect of the disclosure provides a computer readable medium comprising instructions that when executed cause an apparatus to periodically activate a first receiver, wirelessly receive control information during one or more periods in which the first receiver is activated, selectively activate a second receiver based at least in part on the received control information, and wirelessly receive data during one or more periods in which the second receiver is activated. In some aspects, the first receiver consumes a first power when activated, and the second receiver consumes a second power when activated. The first power may be less than the second power.

Another aspect of the disclosure provides an apparatus for wireless communication. The apparatus comprises a receiver configured to wirelessly receive information using a high power mode and a low power mode, and a processor configured to noncontinuously operate the receiver in the low power mode. The processor may be further configured to selectively operate the receiver in the high power mode based at least in part on information received while operating the receiver in the low power mode.

Another aspect of the disclosure provides a method of wireless communication. The method comprises noncontinuously operating a receiver in a low power mode, wirelessly receiving information during one or more periods in which the receiver is operated in the low power mode, and selectively operating the receiver in a high power mode based at least in part on the information received while operating the receiver in the low power mode.

Another aspect of the disclosure provides an apparatus for wireless communication. The apparatus comprises means for wirelessly receiving information using a high power mode and a low power mode, means for noncontinuously operating the receiving means in the low power mode, and means for selectively operating the receiving means in the high power mode based at least in part on information received while operating the receiving means in the low power mode.

Another aspect of the disclosure provides a computer readable medium comprising instructions that when executed cause an apparatus to noncontinuously operate a receiver in a low power mode, wirelessly receive information during one or more periods in which the receiver is operated in the low power mode, and selectively operate the receiver in a high power mode based at least in part on the information received while the receiver is operated in the low power mode.

DETAILED DESCRIPTION

Figure 1:
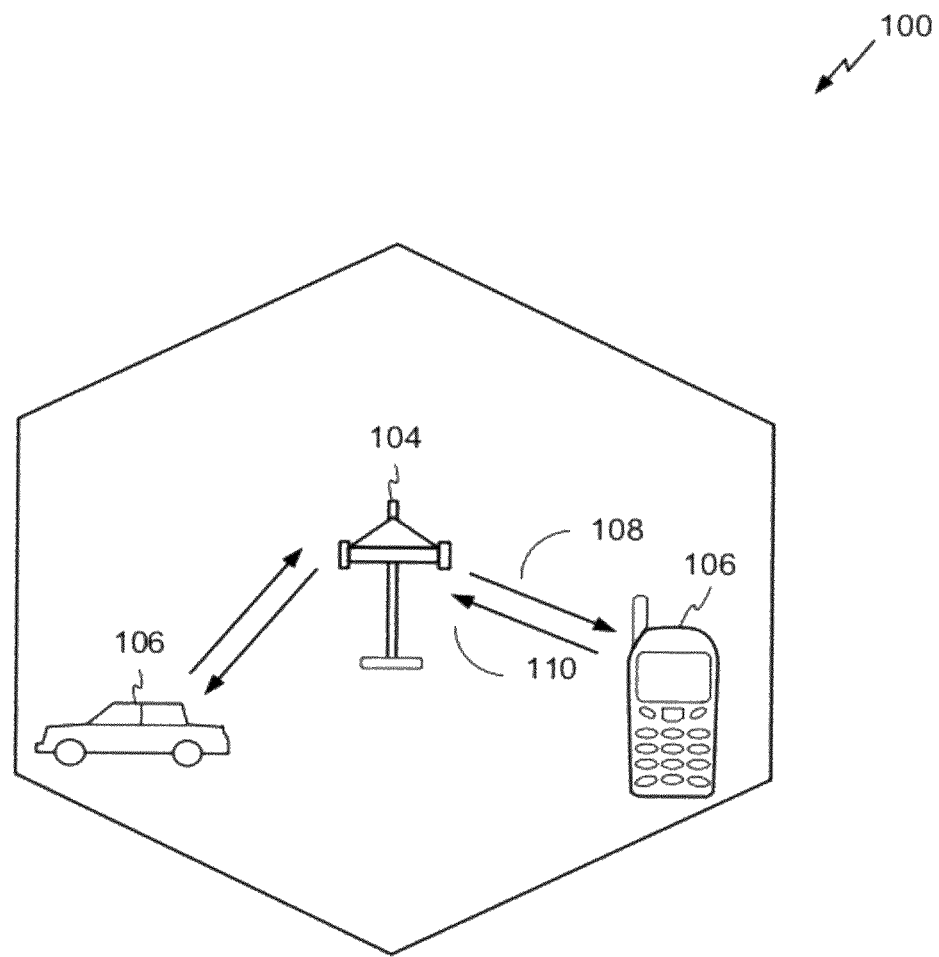
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Aspects of certain devices implementing the 802.11ah protocol may be used to transmit wireless signals across a relatively long range, for example about one kilometer or longer. Some implementations use devices that are deployed for multiple years. Thus, it is advantageous for such devices to consume relatively small amounts of power in order to extend the useful life of the device or a battery powering the device, especially during periods of inactivity.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
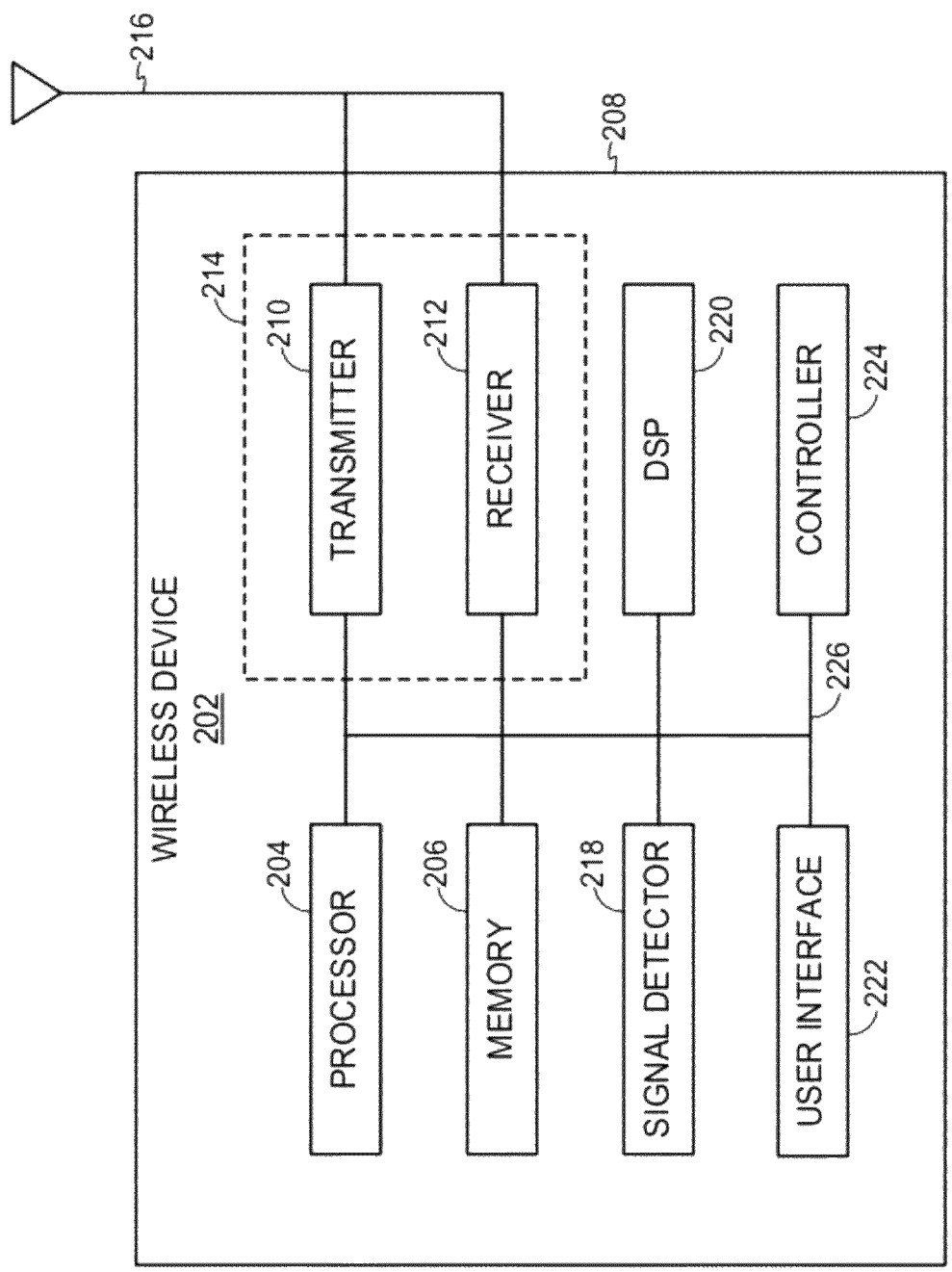
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise one of the STAs 106.

In some aspects, the wireless device 202 may monitor and receive communications in the wireless communication system 100 with a power that is reduced in comparison to known devices. Although power consumption may be reduced, the latency at which communications are received may be maintained at an advantageous level.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. In some aspects, the processor 204 controls or directs certain operations of a receiver 212. For example, the processor 204 may cause or instruct the receiver 212 to switch or transition between several modes. In other aspects, a controller 224 controls or directs operations of the receiver 212, as will be discussed in additional detail below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and the receiver 212 to allow transmission and reception of data or information between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

In some aspects, the receiver 212 is configured with both a low power mode and a high power mode. In the low power mode, the receiver 212 may monitor a wireless channel or receive data or information, for example control or address information. During such monitoring or receiving, the receiver 212 consumes a relatively low amount of power. For example, the receiver 212 may consume approximately 20 mW or less while operating in the low power mode. In some aspects, power consumption is between 1-20 mW in the low power mode. In some aspects, the receiver 212 consumes approximately 60 mW or less while operating in the low power mode. In some aspects, the power is supplied by a battery associated with the wireless device 202. For example, the battery (not shown) may be held in the housing 208. In some aspects, the receiver 212 is configured to receive information using OFDM while operating the low power mode. In other aspects, the receiver 212 is configured to receive information using DSSS while operating in the low power mode. In some aspects, the receiver 212 operates pursuant to the 802.11b standard when activated in the low power mode.

While operating in the high power mode, the receiver 212 may receive data and may consume a greater amount of power than when operating in the low power mode. For example, the receiver 212 may consume approximately 200 mW or more while operating in the high power mode. Thus, power consumption in the high power mode may be approximately 1-2 orders of magnitude greater than power consumption in the low power mode in some aspects. Of course, in other aspects, power consumption in the high power mode may be nearer to power consumption in the low power mode than an order of magnitude. For example, the receiver 212 may consume only slight more power in the high power mode, such as 1-10 mW more. In other aspects, the receiver 212 consumes approximately twice the power when active in the high power mode than when in the low power mode. In some aspects, the receiver 212 consumes approximately 120 mW or greater while operating in the high power mode. In some aspects, the receiver 212 is configured to receive information using OFDM while operating the high power mode. In some aspects, the receiver 212 operates pursuant to the 802.11g or 802.11ac standard when activated in the high power mode.

In some aspects, the receiver 212 is configured to transition between a sleep or inactive mode and one or more active modes. For example, the receiver 212 may be inactive or sleeping for a portion of time, and may subsequently be activated so as to receive information in the low power mode or the high power mode. In some aspects, the receiver is incapable of receiving any information in the sleep mode. The receiver 212 may consume substantially zero power in the sleep mode, or may consume a small amount of power that is less than the power consumed in any of the active modes. In some aspects, the processor 204 or the controller 224 causes the receiver 212 to switch between modes. Certain aspects of the receiver 212 will be described in additional detail below with respect to FIGS. 3A and 3B.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise a controller 224 in some aspects. The controller 224 may control certain operations of the wireless device 202. For example, the controller 224 may control, adjust, or direct operation of the receiver 212. In some aspects, the controller 224 may be configured with functionality that is additional to the functionality of the processor 204. In other aspects, the processor 204 may also or instead implement functionality of the controller 224 described below. In some aspects, the controller 224 may be implemented in the processor 204 or share components with the processor 224. In some aspects, the controller 224 and/or the processor 204 may be implemented in the receiver 212.

The controller 224 may be configured to intermittently operate the receiver 212 in the low power mode, for example with a moderate or low duty cycle. In one aspect, the controller 224 is configured to periodically wake the receiver 212 up from a sleep mode or inactive mode. In various embodiments, the controller 244 can be configured to intermittently or non-continously wake the receiver 212, and may do so randomly, pseudorandomly, or dynamically based on device state. After being woken or activated, the receiver 212 may monitor or scan one or more channels in the wireless communication system 100 for a given period. In some aspects, the receiver 212 is operated in the low power mode with a duty cycle of approximately 1% or less. For example, in one aspect, the controller 224 activates the receiver 212 in the low power mode for a period of 3 milliseconds of every second. Such operation corresponds to a duty cycle of 0.3%. According to another aspect of achieving a duty cycle of 0.3%, the controller 224 may activate the receiver 212 in the low power mode for a period of 10 milliseconds every 3 seconds.

While the receiver 212 is activated in the low power mode, the receiver 212 may scan or monitor for signals in the wireless communication system 100. Any signal that is received while in the low power mode may be evaluated to determine whether the signal includes information intended for or addressed to the wireless device 202. For example, a certain waveform in the signal may identify the wireless device 202. In some aspects, the signal may include one or more paging messages or may comprise a beacon transmitted by the AP 104. The signal may include a hash of a receive Media Access Control (MAC) address, and/or may include a short user-specific message. The signal may be evaluated by one or more of the receiver 212, processor 204, signal detector 218, DSP 220, and controller 224.

If the receiver 212 does not receive any signals intended for or addressed to the wireless device 202 during the period in which the receiver 212 is activated in the low power mode, the controller 224 may return the receiver 212 to the sleep or inactive mode. If the receiver 212 does receive a signal intended for or addressed to the wireless device 202, however, the controller 224 may activate the high power mode of the receiver 212. In this way, the high power mode of the receiver 212 may be selectively activated based at least in part on information receiver while the receiver 212 is operating in the low power mode.

The information intended for or addressed to the wireless device 202 may comprise control information, for example to alert the wireless device 202 that a further communication will subsequently be transmitted to the wireless device 202. Activating the receiver 212 in the high power mode may allow the receiver 212 to properly receive the subsequent communication. In some aspects, the receiver 212 has reduced functionality or operating capacity when operating in the low power mode, as explained in additional detail below. Thus, the receiver 212 may be able to process additional types of communications or a higher volume of communications in the high power mode than in the low power mode. Using a low power mode to monitor the wireless communication system 100, and waking the high power mode when necessary to receive data, reduces the overall power consumed by the wireless device 202. Operating the receiver 212 with a low or moderate duty cycle, instead of continually operating the receiver 212, further reduces power consumption. Due to the low power mode being used for the monitoring instead of the high power mode, the monitoring may be performed more often than if the high power mode were periodically activated to monitor the wireless communication system 100. The more frequent monitoring decreases the latency at which communications may be received by the wireless device 202.

The subsequent communication received in the high power mode of the receiver 212 may comprise packets or other such information comprising user data. The subsequent communication may be received over the same channel on which the signal was received in the low power mode, or over a different channel.

After the receiver 212 has finished receiving one or more further communications, the receiver 212 may be returned to the low power or sleep mode. In some aspects, the receiver 212 receives a message such as a paging message in the high power mode. The message may convey information regarding one or more following communications to the wireless device 212. For example, the paging message may include information regarding a modulation scheme or timing parameters for the following communications. In one aspect, the message indicates when the following communications will be transmitted. In this aspect, the receiver 212 may be returned to the low power or inactive mode until the message is transmitted. In some aspects, the message comprises a Traffic Indication Map (TIM) transmitted in a beacon from the AP 104. In some aspects, the message is received from one of the STAs 106, and may include information about a following communication from the AP 104 or from one of the STAs 106.

Before the controller 224 transitions the receiver 212 between modes, the transmitter 210 may be used to transmit a communication indicating the transition. For example, when the receiver 212 has been receiving data from the AP 104 in the high power mode, the transmitter 210 may be used to alert the AP 104 that the receiver 212 is being returned to a sleep mode.

In some aspects, the duty cycle of the low power mode may be negotiated in the wireless communication system 100. For example, the wireless device 202 may exchange a series of communications with the AP 104 or one of the STAs 106 to wirelessly determine an appropriate duty cycle. In some aspects, this negotiation may be executed when the receiver 212 is transitioning from an active mode to a sleep mode, for example in response to a communication sent from the wireless device 202 to indicate the transition. In some aspects, the negotiation is performed when the receiver 212 is in the low power mode. In some aspects, the negotiation is performed when the receiver 212 is in the high power mode.

In some aspects, the wireless device 202 is alerted of the duty cycle or of a schedule for receiving control information when the wireless device 202 first powers up or connects to the wireless communication network 100. In some aspects, the wireless device 202 stores a default duty cycle, for example in the memory 206, which is used to operate the receiver 212 in the low power mode unless the wireless device 202 is alerted otherwise.

In some aspects, a plurality of the STAs 106 may perform monitoring at a similar time for signals from the AP 104 indicating whether a subsequent communication will be transmitted to one or more of the STAs 106. For example, a plurality of the STAs 106 could listen for an identifying signal during a beacon time. In one aspect, there is a block of time in which all paging messages are transmitted, for example a 2 millisecond period after every 10 beacons are transmitted. Thus, the duty cycle of the wireless device 202 may partially or wholly overlap with the duty cycle of another wireless device in the wireless communication system 100.

In some aspects, a plurality of the STAs 106 may each perform monitoring at a dissimilar time for signals from the AP 104 indicating whether a subsequent communication will be transmitted to a respective one of the STAs 106. For example, each of the plurality of STAs 106 may listen for an identifying signal during a paging slot assigned to that respective STA 106. The paging slot may be negotiated with the respective STA 106, or unilaterally assigned by the AP 104. Thus, the duty cycle of the wireless device 202 may be distinct from the duty cycle of another wireless device in the wireless communication system 100.

Returning to the description of FIG. 2, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the controller 224, as described above, and/or the signal detector 218 or the DSP 220. Further, each of the components illustrated in FIG. 2 may be implemented using a plurality of separate elements.

Figure 3A:
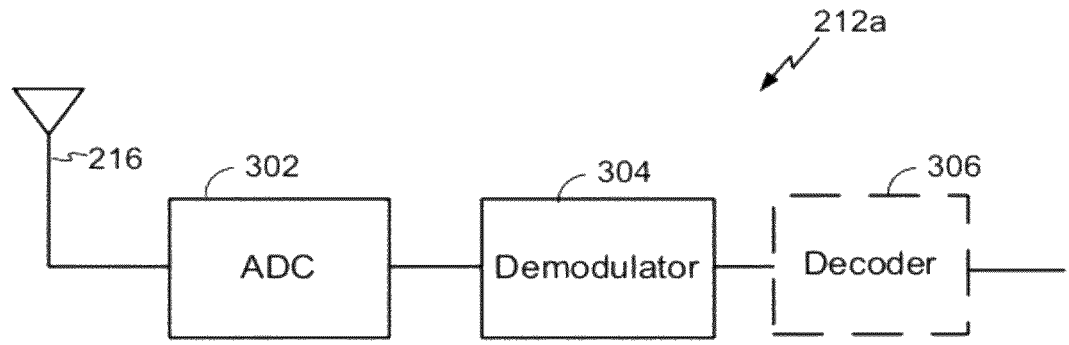
FIG. 3A illustrates various components that may be utilized in the receiver of FIG. 2.

As discussed above, the wireless device 202 may comprise an STA 106, and may be used to transmit and/or receive communications. FIG. 3A illustrates an aspect 212a showing various components that may be utilized in the receiver 212 of the wireless device 202.

The receiver 212a may comprise an analog to digital converter 302 configured to convert a wireless signal received by the receiver 212a into a digital representation thereof. The wireless signal may be processed before being converted by the digital to analog converter 402, for example by being filtered or by being downconverted to an intermediate or baseband frequency. The analog to digital converter 302 may also be partially or wholly implemented in the processor 204 or in another element of the wireless device 202. In some aspects, the analog to digital converter 302 is implemented in the data receive processor.

In some aspects, the analog to digital converter 302 is configured with a plurality of modes. For example, the analog to digital converter 302 may use a different number of bits to convert the signal in each mode. Thus, the number of bits used in the analog to digital converter 302 may vary. In one aspect, the analog to digital modulator 302 uses one bit when the receiver 212a is operating in the low power mode. For example, the controller 224 may cause or instruct the analog to digital converter 302 to use only one bit when monitoring in the low power mode. In some aspects, the analog to digital converter 302 may use more than one bit when the receiver 212a is operating in the high power mode. Such use of more than one bit may be controlled by the controller 224. Although not illustrated, the receiver 212a may further include a digital to analog converter that uses a varying number of bits.

The receiver 212a may further comprise a demodulator 304 configured to demodulate digital data. In one aspect, a transform module such as an FFT is implemented in the demodulator 304 or otherwise within the receiver 212a and converts the digital representation of the wireless signal into symbols in a frequency spectrum. In such aspect, the demodulator 304 may determine a plurality of bits from the symbols by reversing a mapping of bits to a symbol in a constellation. The demodulator 304 may also be partially or wholly implemented in the processor 204 or in another element of the wireless device 202. In some aspects, the demodulator 304 is implemented in the DSP 220.

In some aspects, the demodulator 304 is configured with a plurality of modes. For example, the demodulator 304 may be configured as an OFDM demodulator in some modes, and may be configured as a DSSS demodulator in other modes. In one aspect, the demodulator 304 demodulates OFDM communications when the receiver 212a is in the high power mode. In this aspect, the demodulator 304 may operate pursuant to the 802.11ac or 802.11g standard, or a downclocked version thereof, when the high power mode is activated in the receiver 212a. In one aspect, the demodulator 304 demodulates DSSS communications when the receiver 212a is in the low power mode. In this aspect, the demodulator 304 may operate pursuant to the 802.11b standard, or a downclocked version thereof, when the low power mode is activated in the receiver 212a.

In some aspects, the controller 224 may cause or instruct the demodulator 304 to use one of the modulation modes described above depending on whether the high power mode or low power mode is activated. In other aspects, the demodulator 304 may demodulate OFDM communications regardless of whether the high power mode or low power mode is activated.

The receiver 212a may further comprise a decoder 306 configured to translate the demodulated bits into information for the wireless device 202. For example, when a TIM is received in a beacon, the demodulator 306 may be used to convert data in the demodulated TIM into information regarding frames buffered at the AP 104 that can be used by the wireless device 202 to schedule reception in the high power mode. The decoder 306 may also be partially or wholly implemented in the processor 204 or in another element of the wireless device 202. In some aspects, the decoder 306 is implemented in the DSP 220.

After the data is decoded, it may be processed or evaluated by the processor 204, signal detector 218, the DSP 220, and/or the controller 224, or used to display or otherwise output information to the user interface 222. For example, in some aspects, data decoded from information received in the low power mode may be evaluated to determine whether subsequent communications are addressed to the wireless device 202. If subsequent communications are addressed to the wireless device 202, data decoded from information received in the subsequent communications during the high power mode may be evaluated.

In some aspects, the decoder 306 may be selectively disabled. For example, the decoder 306 may be disabled in certain implementations of the low power mode. In one aspect, the decoder 306 is disabled by the controller 224 in the low power mode when the receiver 212a is monitoring received signals for a certain waveform. In this implementation, it is not necessary to decode the received signal because no information is encoded in the signal. Rather, it is the waveform itself which signifies to the wireless device 202 whether a subsequent communication is addressed to the wireless device 202. When the high power mode is activated, the controller 224 may enable the decoder 306 so that communications received in the high power mode may be decoded. The controller 224 may evaluate received signals to determine when the enable and disable the decoder 306, or may receive instructions on when to do so, for example from the processor 204.

Figure 3B:
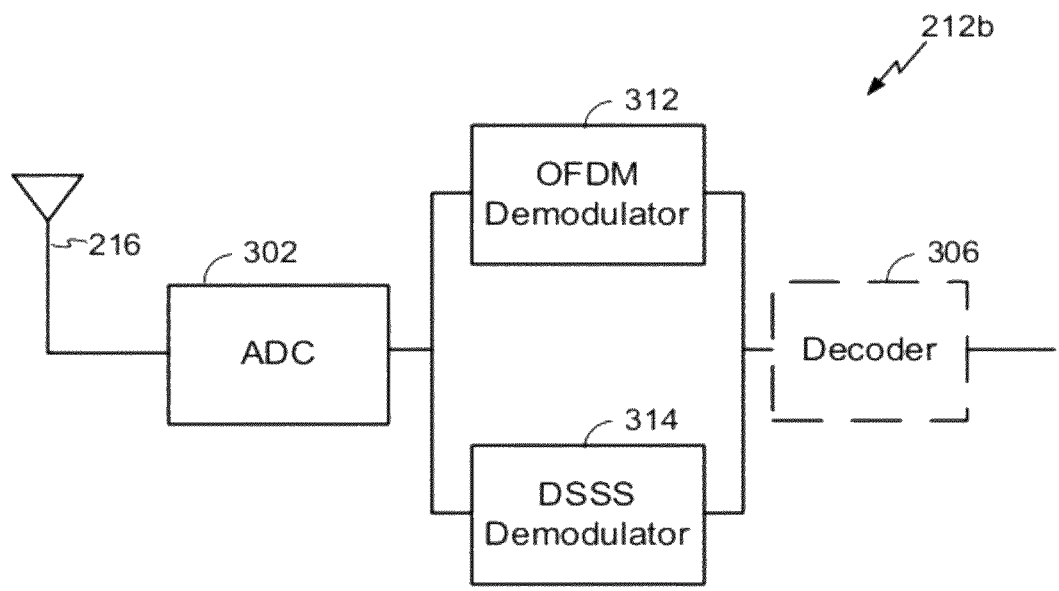
FIG. 3B illustrates various components that may be utilized in the receiver of FIG. 2.

In some aspects, one or more of the components of the receiver 212 may be divided into a plurality of components instead being implemented as a single component having a plurality of modes. For example, FIG. 3B illustrates an aspect 212b showing various components that may be utilized in the receiver 212 of the wireless device 202.

The receiver 212b comprises the analog to digital converter 302 and the decoder 306 discussed above with respect to the receiver 212a. In contrast to the receiver 212a, however, the receiver 212b comprises an OFDM demodulator 312 and a DSSS demodulator 314. Thus, instead of changing a mode of the demodulator 304 depending on whether the high power or lower power mode is activated in the receiver 212, a separate one of the demodulators 312 and 314 may be used depending on which of the high power and low power mode is activated. The OFDM demodulator 312 may be configured with functionality that is similar to the functionality of the demodulator 304 when operating in the OFDM mode, and may operate pursuant to the 802.11ac or 802.11g standards. The DSSS demodulator 314 may be configured with functionality that is similar to the functionality of the demodulator 304 when operating in the DSSS mode, and may operate pursuant to the 802.11b standard.

In some aspects, the analog to digital converter 302 may be split into a plurality of components instead of being implemented as a single component with a plurality of modes. For example, a 1-bit analog to digital converter and a multi-bit analog to digital converted may be implemented separately. In these aspects, a multi-mode demodulator may be used, or the OFDM demodulator 312 and the DSSS demodulator 314 may be used. Further, the output from one or more of the demodulators may bypass the decoder 306 instead of being routed through a disable demodulator.

Figure 3C:
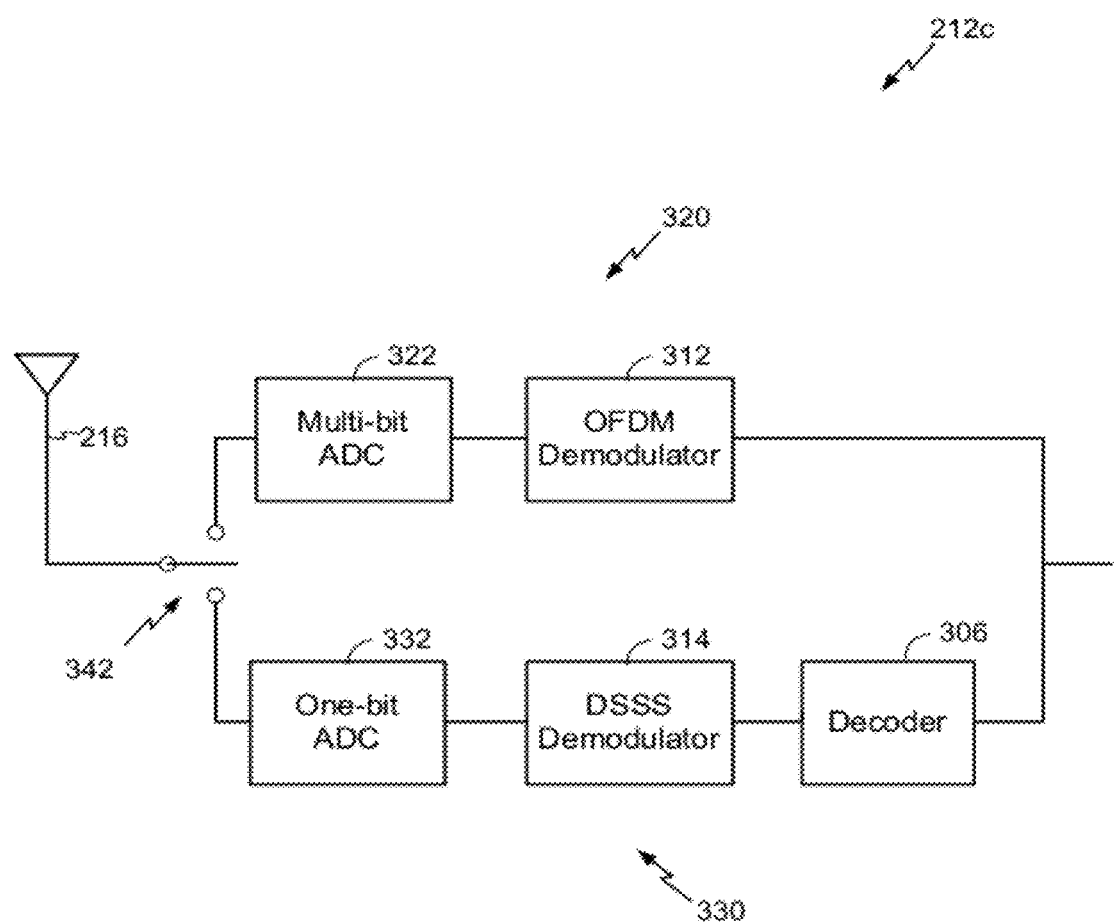
FIG. 3C illustrates various components that may be utilized in the receiver of FIG. 2.

In some aspects, separate receive paths may be used for each of the high power mode and the low power mode of the receiver 212. For example, FIG. 3C illustrates an aspect 212c showing various components that may be utilized in the receiver 212 of the wireless device 202.

In the receiver 212c, a receive path 320 for the high power mode utilizes components separate from the components utilized in a receive path 330 for the low power mode. The receive path 320 includes the OFDM demodulator 312 and the decoder 306. The receive path 320 may also comprise a multi-bit analog to digital converter 322. The multi-bit analog to digital converter 322 may be configured similar to the analog to digital converter 302 when the analog to digital converter 302 is in a mode that uses more than one bit.

The receive path 330 includes the DSSS demodulator 314. The receive path 330 may also comprise a 1-bit analog to digital converter 332. The 1-bit analog to digital converter 332 may be configured similar to the analog to digital converter 302 when the analog to digital converter 302 is in a mode that uses one bit.

The controller 224 (FIG. 2) may transition between the receive paths 320 and 330 using a switch 342 or other selection means. In the illustrated aspect, the receive paths 320 and 330 are in communication with the antenna 216. In other aspects, the receive paths 320 and 330 may be in communication with separate antennas.

One having ordinary skill in the art will appreciate that the receiver 212 may not only consume varying levels of power in a plurality of modes, but that the receiver 212 may also operate with varying levels of complexity in the plurality of modes. In this way, the cost of operating the receiver 212 may be kept low until it is advantageous to increase the power and/or complexity to receive data communications. Further, one having ordinary skill in the art will appreciate that an AP or STA transmitting information to the wireless device 202 may page or wake up the wireless device 202 with a short (e.g., user-specific) DSSS message, and thereafter transmit normal OFDM data communications to the wireless device 202.

One having ordinary skill in the art will recognize that additional elements, components, and/or functionality may be implemented in the receiver 212. For example, the receiver 212 may include an interleaver or deinterleaver, a channel estimator, a gain control, a frequency control, an equalizer, a clock, and/or an error correction module.

Figure 4:
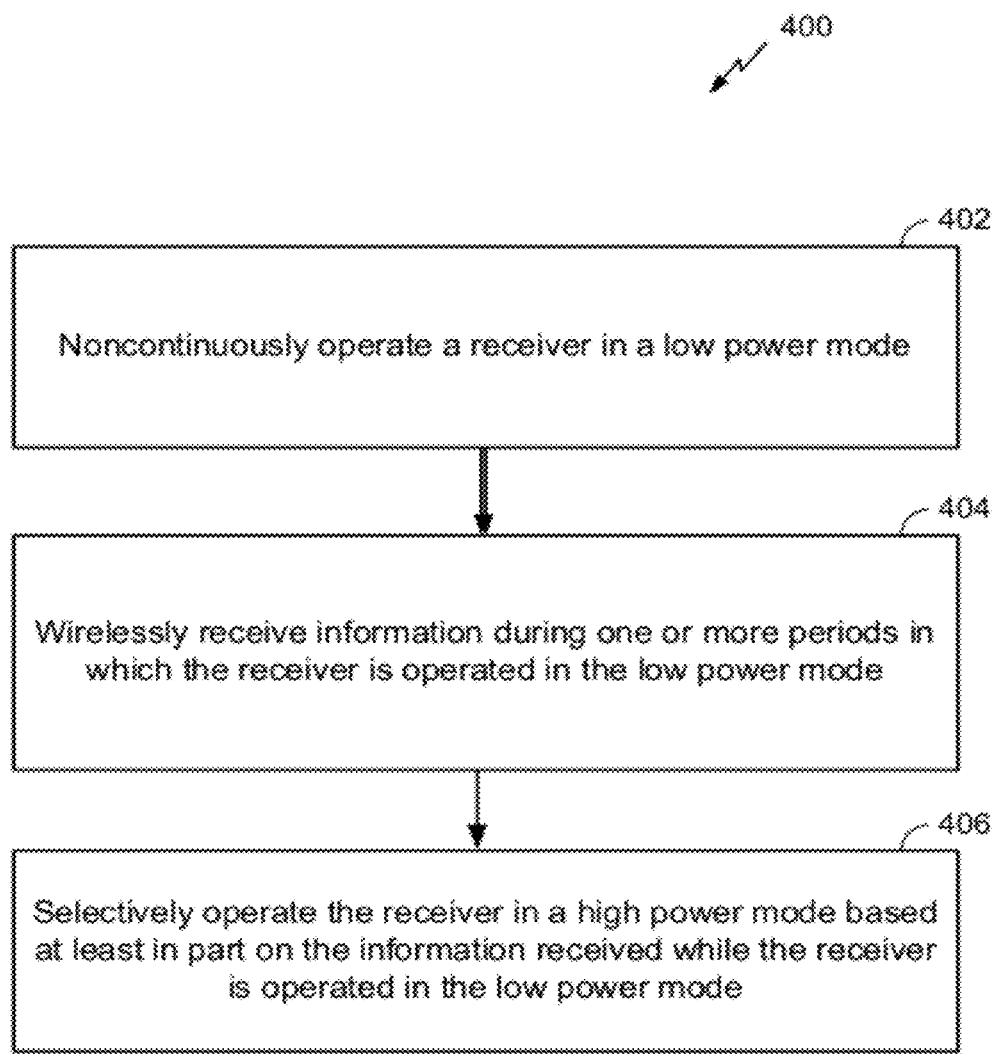
FIG. 4 illustrates an aspect of a method for receiving information.

FIG. 4 illustrates an aspect of a method 400 for receiving information. The method 400 may be used to monitor and receive communications in the wireless communication system 100, for example as described above. The information may be received at one of the STAs 106, from another node in the wireless network 100. Although the method 400 is described below with respect to elements of the wireless device 202, those having ordinary skill in the art will appreciate that other components may be used to implement one or more of the steps described herein.

At block 402, a receiver is noncontinuously operated in a lower power mode. For example, the receiver 212 (FIG. 2) may be operated in the low power mode at a certain duty cycle. Operation of the receiver 212 may in some aspects be controlled at least in part by the controller 224. In some aspects, the low power mode comprises a DSSS mode and/or a low complexity mode, for example according to the 802.11b standard or a downclocked version thereof. In some aspects, an analog to digital converter of the receiver 212 is operated using one bit in the low power mode.

At block 404, information is wirelessly received during one or more periods in which the receiver is operated in the low power mode. For example, a short user-specific message may be received by the receiver 212 in the low power mode. Similarly, a signal having one or more waveforms or a paging message may be received during a period in which the receiver 212 is in the low power mode.

Next, at block 406, the receiver is selectively operated in a high power mode based at least in part on the information received while operating the receiver in the low power mode. For example, the receiver 212 may be switched to the high power mode when information received in the low power mode indicates that there will be a subsequent communication for reception by the wireless device 202. In some aspects, the controller 224 operates the receiver 212 in the high power mode or instructs the receiver 212 to switch between the low power mode and the high power mode. In the high power mode, one or more components of the receiver 212, such as the decoder 306, may be enabled. Similarly, components such as the analog to digital converter 302 and the demodulator 304 may be switched into a different mode, for example in response to directions from the controller 224. In some aspects, the analog to digital converter uses more than one bit in the high power mode. In some aspects, the high power mode comprises an OFDM mode and/or a high complexity mode, for example according to the 802.11g or 802.11ac standard, or a downclocked version thereof.

Figure 5:
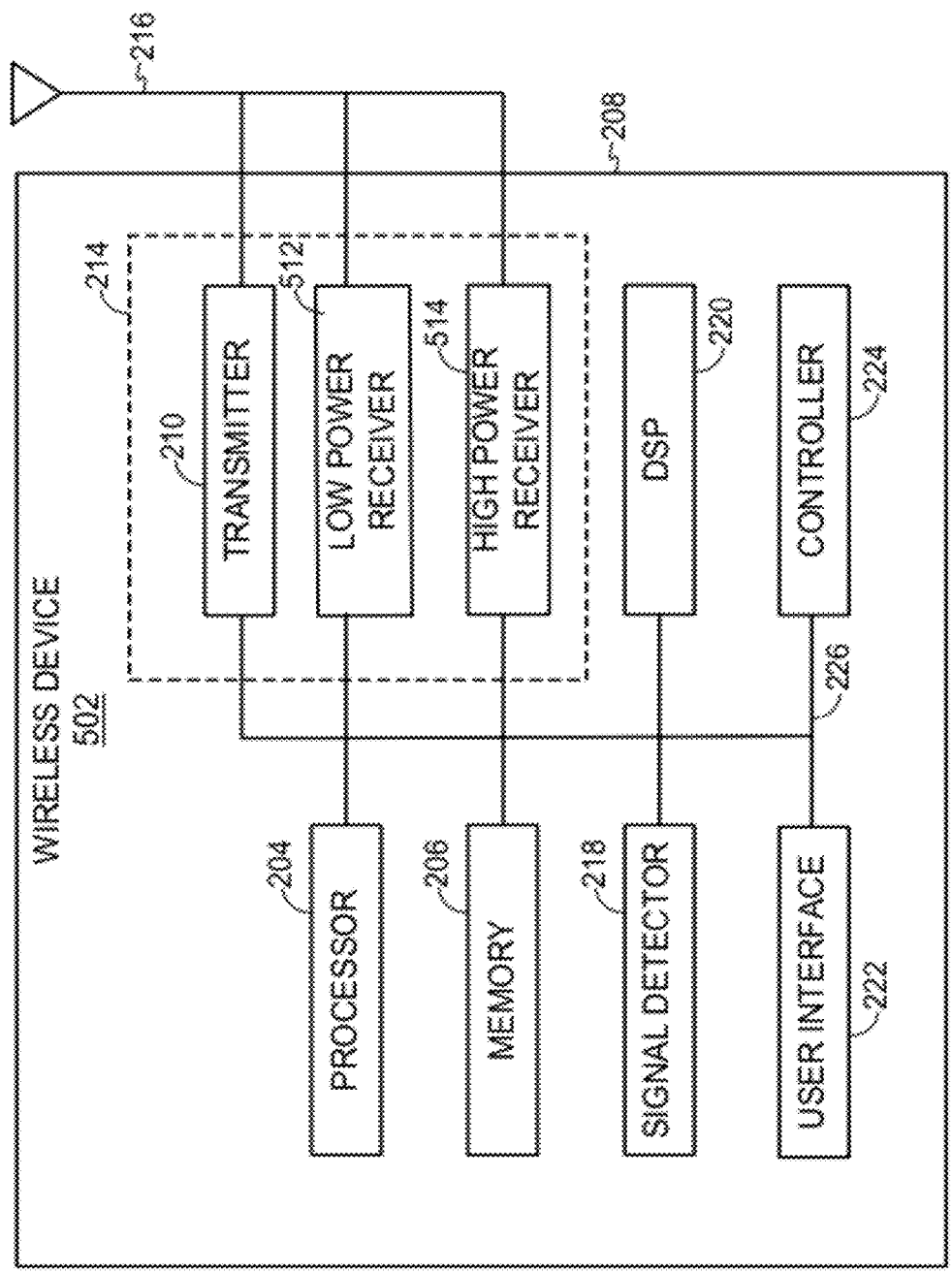
FIG. 5 illustrates various components, including a plurality of receivers, that may be utilized in a wireless device that may be employed within the wireless communication system of FIG. 1.

FIG. 5 illustrates various components that may be utilized in a wireless device 502 that may be employed within the wireless communication system 100. The wireless device 502 is an example of a device that may be configured to implement the various methods described herein. For example, the wireless device 502 may comprise one of the STAs 106.

The wireless device 502 is configured similar to the wireless device 202 illustrated in FIG. 2, except that the wireless device 502 includes a low power receiver 512 and a high power receiver 514 in place of the receiver 212. Thus, as shown in FIG. 5, instead of using a receiver having a low power mode and a high power mode, two separate receivers may be used to monitor and receive information in the communication system 100.

The low power receiver 512 may be configured similar to the receiver 212 when the receiver 212 is in the low power mode. For example, the low power receiver 512 may consume about 20 mW or less when active, and may be placed in a sleep or inactive state. In some aspects, the low power receiver 512 consumes approximately 60 mW or less when active. In one aspect, the controller 224 causes the low power receiver 512 to periodically monitor or receive information, for example at a negotiated or assigned duty cycle. The duty cycle may be approximately 1% or less, for example 0.3%. The low power receiver 512 may scan one or more wireless channels for 3 milliseconds of every second, for example, or for 10 milliseconds every 3 seconds, as another example.

In some aspects, the low power receiver 512 comprises a DSSS receiver. In other aspects, the low power receiver 512 comprises an OFDM receiver. In some aspects, the low power receiver 512 may switch between an OFDM mode and a DSSS mode. In some aspects, the low power receiver 512 is configured to operate according to the 802.11b standard or a downclocked version thereof.

In some aspects, the low power receiver 512 comprises components of the receive path 330 illustrated in FIG. 3C. For example, the low power receiver 512 may comprise the 1-bit analog to digital converter 332 and the DSSS demodulator 314. In other aspects, the low power receiver 512 may comprise an analog to digital converter that uses more than one bit, and/or may comprise a demodulator other than a DSSS demodulator. In some aspects, the low power receiver 512 comprises a decoder.

The high power receiver 514 may be configured similar to the receiver 212 when the receiver 212 is in the high power mode. For example, the high power receiver 514 may consume about 200 mW or more when active, and may be placed in a sleep or inactive state. In some aspects, the high power receiver 514 consumes approximately 120 mW or greater when active. In one aspect, the controller 224 causes the high power receiver 514 to activate or receive data based at least in part on information received by the low power receiver 512. For example, the high power receiver 514 may be activated when a message or signal received at the low power receiver 512 identifies the wireless device 202, a user of the wireless device 202, and/or otherwise indicates that there will be a following communication for reception by the wireless device 202.

In some aspects, the high power receiver 514 comprises an OFDM receiver. In some aspects, the high power receiver 514 is configured to operate according to the 802.11g or 802.11ac standard or a downclocked version thereof. Thus, the low power receiver 512 may be used to monitor the wireless communication system 100 with a moderate or low duty cycle, for example for DSSS or other low-rate pages or communications, and the high power receiver 514 may be selectively used to receive normal OFDM data communications.

In some aspects, the high power receiver 514 comprises components of the receive path 320 illustrated in FIG. 3C. For example, the high power receiver 514 may comprise the multi-bit analog to digital converter 322, the OFDM demodulator 312, and the decoder 306. Thus, the complexity of the high power receiver 514 may be greater than the complexity of the low power receiver 512. In some aspects, the low power receiver 512 may be referred to as a low complexity receiver, and the high power receiver 514 may be referred to as a high complexity receiver.

Data received at the high power receiver 514 may be processed, for example by the processor 204, the signal detector 218, and/or the DSP 220. The processed data may be used to present information to a user on the user interface 220, for example by way of displayed images or reproduced sounds. The processed data may also affect operation of the wireless device 202, for example by indicating a duty cycle or beacon time for the low power receiver, by including encoding or modulation information, by conveying handoff information, or in some other way.

Although the low power receiver 512 and the high power receiver 514 are illustrated as being separate elements, the low power receiver 512 and the high power receiver 514 may share one or more components. For example, the low power receiver 512 and the high power receiver 514 may share circuitry for converting a signal to an intermediate or baseband frequency. Similarly, the low power receiver 512 and the high power receiver 514 may share a decoder while the rest of the components of the low power receiver 512 and the high power receiver 514 are implemented separately.

In the illustrated aspect, the low power receiver 512 and the high power receiver 514 are in communication with the antenna 216. In other aspects, the low power receiver 512 and the high power receiver 514 may be in communication with separate antennas.

Figure 6:
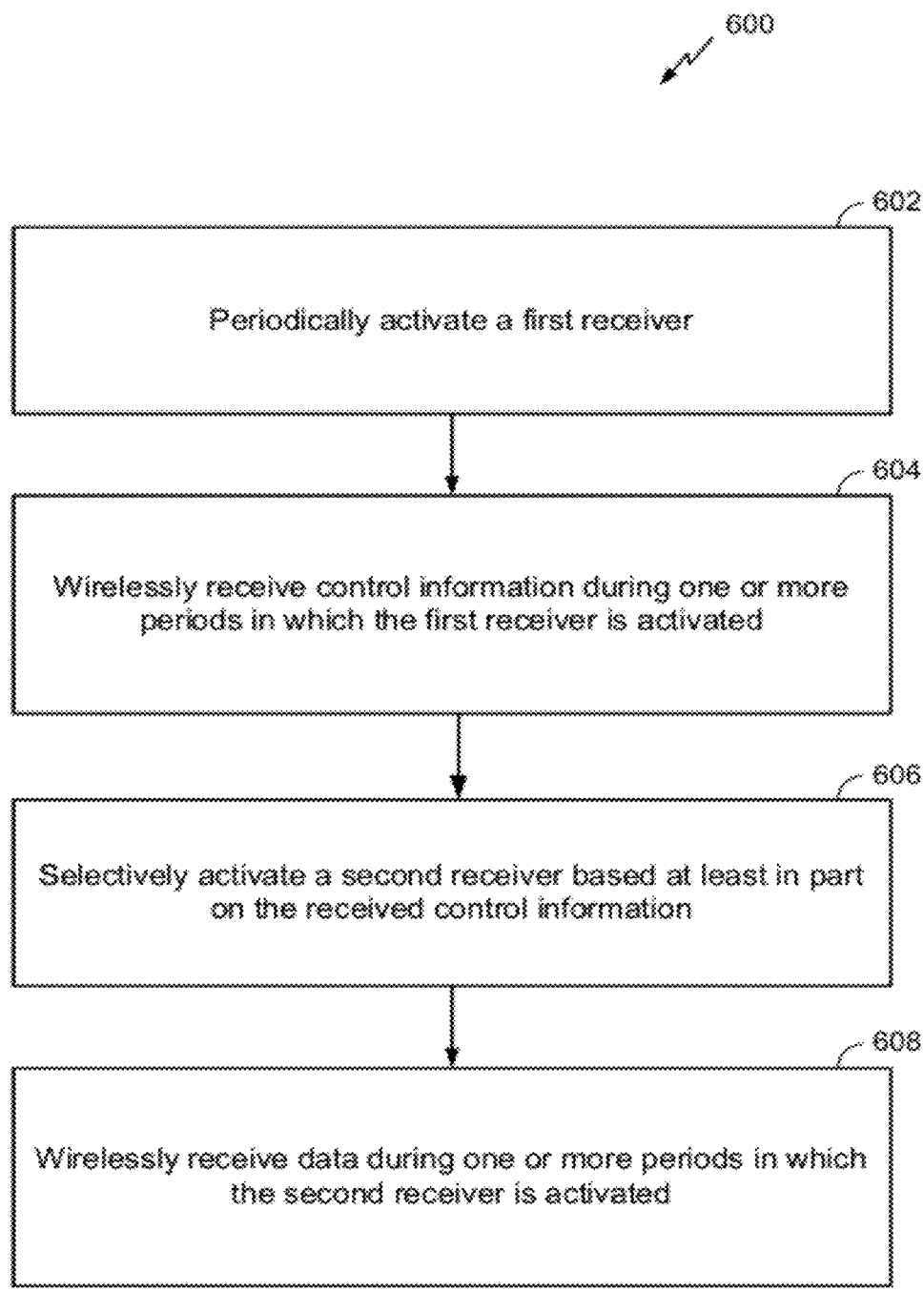
FIG. 6 illustrates an aspect of a method for receiving information.

FIG. 6 illustrates an aspect of a method 600 for receiving information. The method 600 may be used to monitor and receive communications in the wireless communication system 100, for example as described above. The information may be received at one of the STAs 106, from another node in the wireless network 100. Although the method 600 is described below with respect to elements of the wireless device 502, those having ordinary skill in the art will appreciate that other components may be used to implement one or more of the steps described herein.

At block 602, a first receiver is periodically activated. For example, the low power receiver 512 may be operated at a certain duty cycle. Operation of the receiver 512 may in some aspects be controlled at least in part by the controller 224. In some aspects, the first receiver comprises a low complexity receiver. The low power receiver may comprise a DSSS receiver or an OFDM receiver.

At block 604, control information is received during one or more periods in which the first receiver is activated. In some aspects, the control information comprises a short user-specific message, a signal having one or more waveforms, or a paging message.

In some aspects, the control information is received in a DSSS communication, for example according to the 802.11b standard or a downclocked version thereof. In other aspects, the control information is received in an OFDM communication. In some aspects, receiving the control information includes operating an analog to digital converter of the low power receiver 512 using one bit. In other aspects, the analog to digital converter is operated using more than one bit. In some aspects, the received control information is not decoded. In the illustrated aspect, the first receiver consumes a first power, for example from about 1-20 mW, when activated. In some aspects, the first receiver consumes approximately 60 mW or less when activated.

Thereafter, at block 606, a second receiver is selectively activated based at least in part on the received control information. For example, the high power receiver 514 may be activated when information received by the low power receiver 512 indicates that there will be a subsequent communication for reception by the wireless device 202. In some aspects, the controller 224 operates the high power receiver 514 or instructs the transceiver 214 to switch from the low power receiver 512 to the high power receiver 514. In some aspects, the second receiver comprises a high complexity receiver. In some aspects, the second receiver comprises an OFDM receiver.

At block 608, data is wirelessly received during one or more periods in which the second receiver is activated. In some aspects, the data is received according to the 802.11g or 802.11ac standard, or a downclocked version thereof. In some aspects, receiving the data includes operating a multi-bit analog to digital converter of the high power receiver 514. In some aspects, receiving the data comprises decoding the data. In the illustrated aspect, the second receiver consumes a second power, for example about 200 mW or more, when activated. In some aspects, the second receiver consumes approximately 120 mW or greater when activated.

Figure 7:
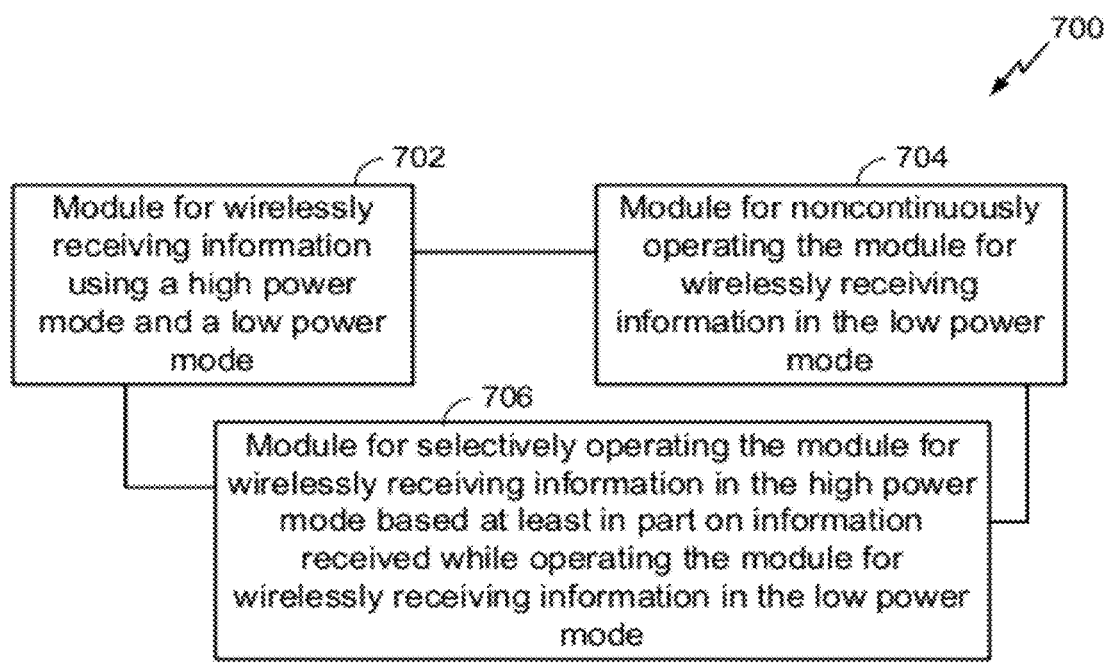
FIG. 7 is a functional block diagram of another exemplary wireless device that may be employed within the wireless communication system of FIG. 1.

FIG. 7 is a functional block diagram of another exemplary wireless device 700 that may be employed within the wireless communication system 100. The device 700 comprises a module 702 for wirelessly receiving information using a high power mode and a low power mode. The module 702 may be configured to perform one or more of the functions discussed above with respect to the block 404 illustrated in FIG. 4. The module 702 may comprise the receiver 212. The module 702 may further comprise one or more of the processor 204, the DSP 220, and the controller 224.

The device 700 further comprises a module 704 for non-continuously operating the receiving means in the low power mode. The module 704 may be configured to perform one or more of the functions discussed above with respect to the block 402 illustrated in FIG. 4. The module 704 may comprise the processor 204 and/or the controller 224.

The device 700 further comprises a module 706 for selectively operating the receiving means in the high power mode based at least in part on information received while operating the receiving means in the low power mode. The module 706 may be configured to perform one or more of the functions discussed above with respect to the block 406 illustrated in FIG. 4. The module 706 may comprise the processor 204 and/or the controller 224.

Figure 8:
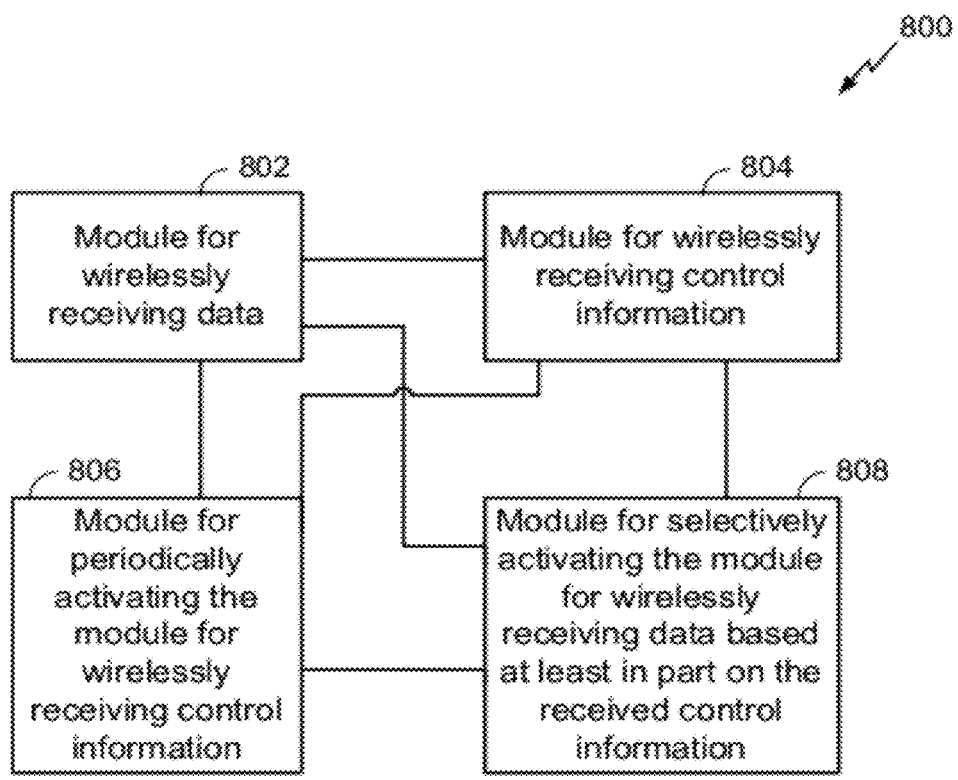
FIG. 8 is a functional block diagram of yet another exemplary wireless device that may be employed within the wireless communication system of FIG. 1.

FIG. 8 is a functional block diagram of yet another exemplary wireless device 800 that may be employed within the wireless communication system 100. The device 800 comprises a module 802 for wirelessly receiving data. The module 802 may be configured to perform one or more of the functions discussed above with respect to the block 604 illustrated in FIG. 6. In some aspects, the module 802 consumes a first power when activated.

The device 800 further comprises a module 804 for wirelessly receiving control information. The module 804 may be configured to perform one or more of the functions discussed above with respect to the block 608 illustrated in FIG. 6. In some aspects, the module 804 consumes a second power, which is less than the first power, when activated. In some aspects, the modules 802 and 804 comprise two separate receivers. In some aspects, the module 802 and 804 share some components. In some aspects, the module 802 and 804 may comprise a single receiver having a high power mode and a low power mode.

The device 800 further comprises a module 806 for periodically activating the module 802. The module 806 may be configured to perform one or more of the functions discussed above with respect to the block 602 illustrated in FIG. 6. The module 806 may comprise the processor 204 and/or the controller 224. In some aspects, the module 806 is implemented internal to a receiver implementing one or both of the modules 802 and 804.

The device 800 further comprises a module 808 for selectively activating the module 804 based at least in part on the received control information. The module 808 may be configured to perform one or more of the functions discussed above with respect to the block 606 illustrated in FIG. 6. The module 808 may comprise the processor 204 and/or the controller 224. In some aspects, the module 808 is implemented internal to a receiver implementing one or both of the modules 802 and 804.

One having ordinary skill in the art will appreciate that the systems, methods, and devices described herein may monitor and receive data in a wireless network using a relatively low amount of power. In this way, the battery life of such devices may be extended so as to last for several years or more. Such battery life may be advantageous in many apparatuses, for example in fire alarms or health monitoring equipments. Although power consumption is low, latency of communications in the wireless network are not adversely affected.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication in a wireless network, comprising:
    a first receiver configured to wirelessly receive data, the first receiver consuming a first power when activated;
    a second receiver configured to wirelessly receive control information, the control information comprising a message identifying one or more devices within the wireless network to which subsequent communications are addressed, the second receiver consuming a second power when activated, the second power being less than the first power; and
    a processor configured to noncontinuously activate the second receiver to wirelessly receive the control information, and to selectively activate the first receiver to wirelessly receive data when the message received by the second receiver indicates that there will be a subsequent communication for reception by the apparatus.

2. The apparatus of claim 1, wherein the message identifies the one or more devices with a hash of a media access control (MAC) address for an intended receiver.

3. The apparatus of claim 1, wherein the one or more devices are identified by one or more waveforms, and wherein the second receiver is configured to receive the message without using a decoder.

4. The apparatus of claim 1, wherein the first receiver comprises an orthogonal frequency-division multiplexing (OFDM) receiver.

5. The apparatus of claim 1, wherein the second receiver comprises a Direct-sequence spread spectrum (DSSS) receiver.

6. The apparatus of claim 1, wherein the second receiver comprises an orthogonal frequency-division multiplexing (OFDM) receiver.

7. The apparatus of claim 1, wherein the second receiver comprises a 1-bit analog-to-digital converter (ADC).

8. The apparatus of claim 1, wherein the processor is configured to activate the second receiver with a duty cycle of approximately 1% or less.

9. The apparatus of claim 1, wherein the processor is configured to activate the second receiver with a duty cycle of approximately 0.3% or less.

10. The apparatus of claim 1, wherein the processor is configured to activate the second receiver for approximately 3 ms or less, and to thereafter return the second receiver to a sleep mode if a communication is not received identifying the apparatus.

11. The apparatus of claim 1, wherein the first power is at least an order of magnitude greater than the second power.

12. The apparatus of claim 1, wherein the first power is approximately 120 mW or greater, and wherein the second power is approximately 60 mW or less.

13. A method of wireless communication in a wireless network, comprising:
    periodically activating a first receiver of a device;
    wirelessly receiving control information via the first receiver during one or more periods in which the first receiver is activated, the control information comprising a message identifying one or more devices within the wireless network to which subsequent communications are addressed, wherein the first receiver consumes a first power when activated;
    selectively activating a second receiver of the device when the message received by the first receiver indicates that there will be a subsequent communication for reception by the device; and
    wirelessly receiving data included in the subsequent communication via the second receiver during one or more periods in which the second receiver is activated, wherein the second receiver consumes a second power when activated, the first power being less than the second power.

14. The method of claim 13, wherein the message identifies the one or more devices with a hash of a media access control (MAC) address for an intended receiver.

15. The method of claim 13, wherein the one or more devices are identified by one or more waveforms, and wherein the method further comprises processing the received control information without decoding the received control information.

16. The method of claim 13, wherein the data is received using orthogonal frequency-division multiplexing (OFDM).

17. The method of claim 13, wherein the control information is received using in direct-sequence spread spectrum (DSSS) communication.

18. The method of claim 13, wherein the control information is received using orthogonal frequency-division multiplexing (OFDM).

19. The method of claim 13, further comprising converting the received control information from analog to digital using a 1-bit analog-to-digital converter (ADC).

20. The method of claim 13, wherein the periodically activating the first receiver comprises activating the first receiver with a duty cycle of approximately 1% or less.

21. The method of claim 13, wherein the periodically activating the first receiver comprises activating the first receiver with a duty cycle of approximately 0.3% or less.

22. The method of claim 13, wherein the periodically activating the first receiver comprises activating the first receiver for approximately 3 ms or less, and thereafter returning the first receiver to a sleep mode if a communication is not received identifying the device.

23. The method of claim 13, wherein the second power is at least an order of magnitude greater than the first power.

24. The method of claim 13, wherein the second power is approximately 120 mW or greater, and wherein the first power is approximately 60 mW or less.

25. An apparatus for wireless communication in a wireless network, comprising:
    means for wirelessly receiving data, the means for wirelessly receiving data consuming a first power when activated;
    means for wirelessly receiving control information, the control information comprising a message identifying one or more devices within the wireless network to which subsequent communications are addressed, the means for wirelessly receiving control information consuming a second power when activated, the second power being less than the first power;

means for periodically activating the means for wirelessly receiving control information; and means for selectively activating the means for wirelessly receiving data when the message received by the means for wirelessly receiving control information indicates that there will be a subsequent communication for reception by a device that includes the means for wirelessly receiving data.

26. The apparatus of claim 25, wherein the means for wirelessly receiving data comprises a first receiver, and wherein the means for wirelessly receiving control information comprises a second receiver that is separate from the first receiver.

27. The apparatus of claim 25, wherein the means for wirelessly receiving data and the means for wirelessly receiving control information are implemented as a single receiver, wherein one or more components used during an active mode of the means for wirelessly receiving data are disabled during an active mode of the means for wirelessly receiving control information.

28. The apparatus of claim 25, wherein the means for wirelessly receiving data comprises a first receiver, wherein the means for wirelessly receiving control information comprises a second receiver, and wherein the first receiver and the second receiver share one or more components.

29. The apparatus of claim 25, wherein at least one of the means for periodically activating and the means for selectively activating comprise a processor.

30. The apparatus of claim 29, wherein the means for wirelessly receiving data or the means for wirelessly receiving control information is implemented in a receiver with the processor.

31. The apparatus of claim 25, wherein the means for periodically activating switches the means for wirelessly receiving control information between a sleep mode and an active mode at a duty cycle.

32. The apparatus of claim 31, wherein the duty cycle is wirelessly negotiated.

33. The apparatus of claim 25, further comprising means for transmitting a message indicating that one or both of the means for wirelessly receiving data and the means for wirelessly receiving control information are entering a sleep mode.

34. The apparatus of claim 25, wherein the means for wirelessly receiving data receives the data over a first wireless channel, and wherein the means for receiving control information receives the control information over the first wireless channel.

35. The apparatus of claim 25, wherein the means for wirelessly receiving data receives the data over a first wireless channel, and wherein the means for receiving control information receives the control information over a second wireless channel separate from the first wireless channel.

36. The apparatus of claim 25, wherein the means for wirelessly receiving data uses an 802.11ac standard.

37. The apparatus of claim 25, wherein the means for wirelessly receiving control information uses an 802.11b standard.

38. The apparatus of claim 25, wherein the means for wirelessly receiving data uses orthogonal frequency-division multiplexing (OFDM).

39. A non-transitory computer-readable medium comprising instructions that when executed cause an apparatus to:

periodically activate a first receiver of a device;

wirelessly receive control information via the first receiver during one or more periods in which the first receiver is activated, the control information comprising a message identifying one or more devices within a wireless network to which subsequent communications are addressed, wherein the first receiver consumes a first power when activated;

selectively activate a second receiver of the device when the message received by the first receiver indicates that there will be a subsequent communication for reception by the device; and wirelessly receive data included in the subsequent communication via the second receiver during one or more periods in which the second receiver is activated, wherein the second receiver consumes a second power when activated, the first power being less than the second power.

40. An apparatus for wireless communication in a wireless network, comprising:

a receiver configured to wirelessly receive information using a high power mode and a low power mode; and a processor configured to noncontinuously operate the receiver in the low power mode, and to selectively operate the receiver in the high power mode based at least in part on information received while operating the receiver in the low power mode, wherein the information received while operating the receiver in the low power mode comprises a message identifying one or more devices within the wireless network to which subsequent communications are addressed, and wherein the processor is configured to operate the receiver in the high power mode when the message indicates that there will be a subsequent communication for reception by the apparatus.

41. The apparatus of claim 40, wherein the processor is configured to disable one or more components of the receiver when operating the receiver in the low power mode.

42. The apparatus of claim 41, wherein the receiver comprises a decoder, wherein the receiver is configured to decode information using the decoder when operating in the high power mode, and wherein the processor is configured to disable the decoder when operating the receiver in the low power mode.

43. The apparatus of claim 40, wherein the receiver comprises an analog-to-digital converter (ADC) configured to operate using a variable number of bits, wherein the ADC is operated with a higher number of bits when the receiver is using the high power mode than when the receiver is using the low power mode.

44. The apparatus of claim 40, wherein the receiver is configured to receive a beacon when operating in the low power mode.

45. The apparatus of claim 40, wherein the receiver is operated with a duty cycle of approximately 1% or less during the noncontinuous operation.

46. The apparatus of claim 40, wherein the processor is configured to operate the receiver in the low power mode for approximately 3 ms or less during the noncontinuous operation, and to thereafter return the receiver to a sleep mode if a communication is not received identifying the apparatus.

47. The apparatus of claim 40, wherein the receiver operates at approximately 120 mW or greater in the high power mode, and at approximately 60 mW or less in the low power mode.

48. The apparatus of claim 40, wherein the receiver is configured to wirelessly receive the information using orthogonal frequency-division multiplexing (OFDM).

49. A method of wireless communication in a wireless network, comprising:
noncontinuously operating a receiver of a device in a low power mode;
wirelessly receiving information during one or more periods in which the receiver is operated in the low power mode, the information comprising a message identifying one or more devices within the wireless network to which subsequent communications are addressed; and
selectively operating the receiver in a high power mode when the message received while operating the receiver in the low power mode indicates that there will be a subsequent communication for reception by the device.

50. The method of claim 49, comprising disabling one or more components of the receiver when operating the receiver in the low power mode.

51. The method of claim 50, comprising decoding information using the decoder when operating the receiver in the high power mode, and disabling the decoder when operating the receiver in the low power mode.

52. The method of claim 49, comprising operating an ADC with a higher number of bits when the receiver is using the high power mode than when the receiver is using the low power mode.

53. The method of claim 49, wherein the wirelessly receiving information comprises receiving a beacon.

54. The method of claim 49, wherein the noncontinuously operating the receiver comprises operating the receiver with a duty cycle of approximately 1% or less.

55. The method of claim 49, wherein the noncontinuously operating the receiver comprises operating the receiver for approximately 3 ms or less, and thereafter returning the receiver to a sleep mode if a communication is not received identifying the apparatus.

56. The method of claim 49, wherein the receiver operates at approximately 120 mW or greater in the high power mode, and at approximately 60 mW or less in the low power mode.

57. The method of claim 49, wherein the receiver is configured to wirelessly receive the information using orthogonal frequency-division multiplexing (OFDM).

58. An apparatus for wireless communication in a wireless network, comprising:
means for wirelessly receiving information using a high power mode and a low power mode;
means for noncontinuously operating the receiving means in the low power mode; and
means for selectively operating the receiving means in the high power mode based at least in part on information received while operating the receiving means in the low power mode, wherein the information received while operating the receiving means in the low power mode comprises a message identifying one or more devices within the wireless network to which subsequent communications are addressed, and wherein the means for selectively operating is configured to operate the receiving means in the high power mode when the message indicates that there will be a subsequent communication for reception by the apparatus.

59. The apparatus of claim 58, wherein the receiving means comprises a receiver.

60. The apparatus of claim 58, wherein the means for noncontinuously operating or the means for selectively operating comprises a controller.

61. The apparatus of claim 58, further comprising means for disabling one or more components of the receiving means when operating the receiving means in the low power mode.

62. The apparatus of claim 61, wherein the receiving means comprises means for decoding, wherein the receiving means decodes information using the decoding means when operating in the high power mode, and wherein the disabling means disables the decoding means when the receiving means is operating in the low power mode.

63. The apparatus of claim 58, further comprising means for converting the received information from analog to digital using a variable number of bits, wherein the converting means is operated with a higher number of bits when the receiving means is using the high power mode than when the receiving means is using the low power mode.

64. The apparatus of claim 58, wherein the receiving means comprises means for receiving a beacon when operating in the low power mode.

65. The apparatus of claim 58, wherein the receiving means is operated with a duty cycle of approximately 1% or less during the noncontinuous operation.

66. The apparatus of claim 58, wherein the receiving means is configured to wirelessly receive the information using orthogonal frequency-division multiplexing (OFDM).

67. A non-transitory computer-readable medium comprising instructions that when executed cause an apparatus to:
noncontinuously operate a receiver of a device in a low power mode;
wirelessly receive information during one or more periods in which the receiver is operated in the low power mode, the information comprising a message identifying one or more devices within a wireless network to which subsequent communications are addressed; and
selectively operate the receiver in a high power mode when the message received while the receiver is operated in the low power mode indicates that there will be a subsequent communication for reception by the device.

* * * * *